(12) United States Patent
Glaesser

(10) Patent No.: US 7,340,321 B2  
(45) Date of Patent: Mar. 4, 2008

(54) METHOD AND DEVICE FOR MILLING FREEFORM SURFACES

(75) Inventor: Arndt Glaesser, Dachau (DE)

(73) Assignee: MTU Aero Engines GmbH, Munich (DE)

( * ) Notice: Subject to any disclaimer, the term of this patent is extended or adjusted under 35 U.S.C. 154(b) by 0 days.

(21) Appl. No.: 10/557,267

(22) PCT Filed: Apr. 17, 2004

(86) PCT No.: PCT/DE2004/000807

§ 371 (c)(1),  
(2), (4) Date: Aug. 15, 2006

(87) PCT Pub. No.: WO2004/103622

PCT Pub. Date: Dec. 2, 2004

(65) Prior Publication Data

US 2007/0067061 A1 Mar. 22, 2007

(30) Foreign Application Priority Data

May 17, 2003 (DE) ................................ 103 22 340

(51) Int. Cl.  
*G06F 19/00* (2006.01)

(52) U.S. Cl. .................................... 700/187

(58) Field of Classification Search ................ 700/159, 700/173, 177, 178, 186, 187, 190–193  
See application file for complete search history.

(56) References Cited

U.S. PATENT DOCUMENTS

| | | | |
|---|---|---|---|
| 4,283,044 A * | 8/1981 | McKibbin et al. ............. 266/67 |
| 4,559,601 A * | 12/1985 | Kishi et al. .................. 700/187 |
| 4,596,501 A | 6/1986 | Wu |
| 4,703,146 A * | 10/1987 | Kinoshita ................ 219/69.12 |
| 4,713,517 A * | 12/1987 | Kinoshita ................ 219/69.12 |
| 5,107,436 A | 4/1992 | Levine et al. |
| 5,808,263 A * | 9/1998 | Beltrami .................. 219/69.12 |
| 5,935,456 A * | 8/1999 | Braunschweiler et al. ........................ 219/69.12 |
| 6,311,100 B1 | 10/2001 | Sarma et al. |
| 6,323,863 B1 * | 11/2001 | Shinagawa et al. ......... 345/441 |
| 6,485,236 B1 * | 11/2002 | Engeli et al. ............... 409/132 |
| 6,632,053 B2 * | 10/2003 | Koch ......................... 409/132 |
| 6,895,299 B2 * | 5/2005 | Red et al. ................... 700/186 |
| 6,968,256 B2 * | 11/2005 | Graham et al. ............. 700/186 |
| 7,149,599 B2 * | 12/2006 | Arai et al. .................. 700/186 |
| 2002/0048494 A1* | 4/2002 | Haberstock ................. 409/132 |

FOREIGN PATENT DOCUMENTS

DE 196 07 192 1/1997  
DE 198 46 426 4/2000

* cited by examiner

Primary Examiner—M. N. Von Buhr  
(74) Attorney, Agent, or Firm—Kenyon & Kenyon LLP

(57) ABSTRACT

In a method and a device for cutting freeform surfaces, a workpiece is cut by a tool or a cutter to produce a desired freeform surface. For the purpose of cutting, the tool is moved along at least one defined tool path or cutting path relative to the workpiece. In addition to the, or each tool path, at least one guide curve is defined for a tool vector of the tool, the tool vector being oriented as a function of the, or each guide curve 12 during the cutting.

13 Claims, 3 Drawing Sheets

METHOD AND DEVICE FOR MILLING FREEFORM SURFACES

Figure 3:
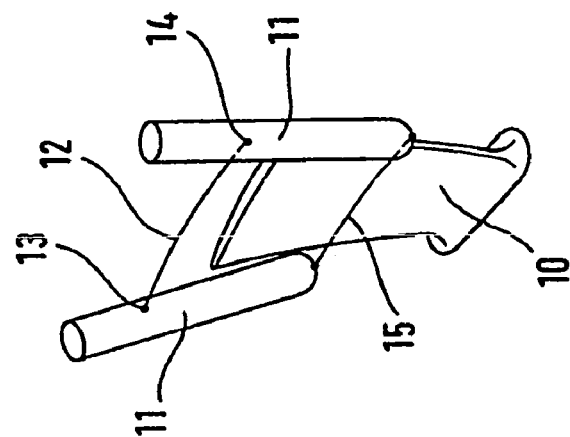

The present invention relates to a method for cutting freeform surfaces according to the definition of the species in Claim 1. In addition, the present invention relates to a device for cutting freeform surfaces according to the definition of the species in Claim 11.

The present invention relates to the area of cutting technology, particularly to HSC cutting (high-speed cutting), which is also known as HPC cutting (high performance cutting).

According to the related art, the HSC cutting of a workpiece to provide a desired, three-dimensional geometry, i.e. to provide a desired freeform surface on the workpiece, causes considerable problems. In the case of low advance rates of the tool or the cutter, the cutting motion already no longer proceeds harmonically, but rather in a jerky manner. This causes the mechanics of a cutting machine to vibrate. As a result of these vibrations, deep marks or vibrational patterns are formed on the surface of the workpiece to be machined. In this context, these irregularities in the produced freeform surface of the machined workpiece are so severe that subsequent smoothing of the surface is not possible or is only possible at great expense. This is particularly the case when the workpiece to be machined is a rotor blade of a gas turbine, or a bladed disk known as a blisk. It is presently not possible to mass-produce blisks, using the cutting methods known from the related art.

The above-described problems with the HSC cutting of, in particular, blisks are produced by discontinuities or sharp changes in the shape of the cutting path or in the path of the tool vectors. As discussed below in greater detail, these irregularities or sharp changes may be caused, on one hand, directly by the CAD model and, on the other hand, by the manner of defining the tool vectors:

CAD model as the reason: Each CAD model includes several surfaces, which are made up, in turn, of several patches. In the transition from one surface to an adjacent surface, or from one patch to an adjacent patch, discontinuities (non-tangential or discontinuous-curvature transitions, gaps, steps, overlaps) may occur. Depending on the manner in which the surfaces were defined, the surfaces may also tend to vibrate within the patches or within the surfaces. The vibrations manifest themselves in a sharp periodic change in the curvature. Discontinuities and vibrations have a direct effect on the tool path. The effect on the path of the tool vectors is a function of the manner in which the tool vectors are defined.

Definition of the tool vectors as a reason: According to the related art, there are three methods for defining the tool vectors. A first method uses constant tool vectors: This method is not suitable for cutting freeform surfaces, since freeform surfaces cannot be machined in a collision-free manner, using a constant tool vector. A second method utilizes interpolated tool vectors: In this method, support vectors are defined along the cutting path, between which the tool vector is interpolated. As a rule, tool vectors are linearly interpolated between the support vectors, which results in discontinuities in the path of the tool vectors at the position of the support vectors. A third method defines tool vectors in relation to the surface, specifying a setting angle and an advance angle: In this method, the path of the tool vectors is a direct function of the quality of the CAD model. Discontinuities or vibrations have a direct effect on the path of the tool vectors.

Using this as a starting point, the present invention is based on the problem of providing a novel method for cutting freeform surfaces, as well as a corresponding device.

This problem is solved by further refining the method for cutting freeform surfaces mentioned at the outset, using the features of the characterizing part of Claim 1.

In addition to the, or each tool path, the present invention provides for at least one guide curve to be defined for a tool vector of the tool; during the cutting, the tool vector being oriented as a function of the, or each guide curve. The present invention sets forth a method for defining the tool vectors, where the path of the tool vectors is not a function of the quality of the surface to be machined. The present invention ensures that the path of the tool vectors is always continuous.

A first advantageous refinement of the present invention provides for a single guide curve to be defined for the tool vector, the tool vector being oriented in such a manner that the tool vector starts out from a tool tip and runs through the guide curve, and the tool tip being moved along the tool path. This refinement of the method according to the present invention is then advantageous, when the workpiece to be machined or the freeform surface to be cut does not have any sharp curvature at right angles to the cutting direction, and when the position of the tool or the cutter can be roughly the same from the first to the last cutting path.

An alternative, second advantageous refinement of the present invention provides for two guide curves to be defined for the tool vector of the tool, a guide surface being determined by the two guide curves, and a guide curve situated in the guide surface being ascertained as a function of a ratio of the current cutting path to the total number of cutting paths, the tool vector of the tool being guided by the guide curve. This refinement of the method according to the present invention is then advantageous, when the workpiece to be machined has a sharp curvature at right angles to the cutting direction and the position of the tool or the cutter must be changed more sharply from the first to the last cutting path.

In addition to the, or each guide curve, synchronization points are advantageously defined, the orientation of the tool vector between the, or each tool path and the, or each guide curve being synchronized with the aid of the synchronization points. This is then advantageous, when the tool path or cutting path has a shape or relative size that deviates from the guide curve.

The device according to the present invention is characterized by the features of Claim 11. At least one programming device is present for programming at least one tool path or cutter path; for the purpose of cutting, the tool being movable along the, or each tool path, relative to the workpiece. In addition, means for programming at least one guide curve for a tool vector of the tool are present, the tool vector being controllable as a function of the, or each guide curve during the cutting.

Preferred further developments of the present invention are revealed by the dependent claims and the following description.

Figure 2:
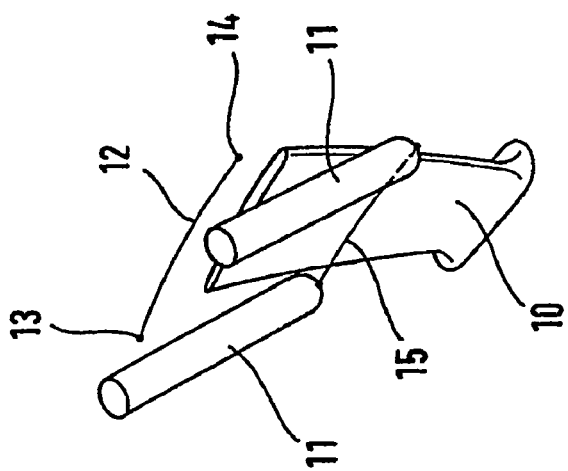
Figure 1:
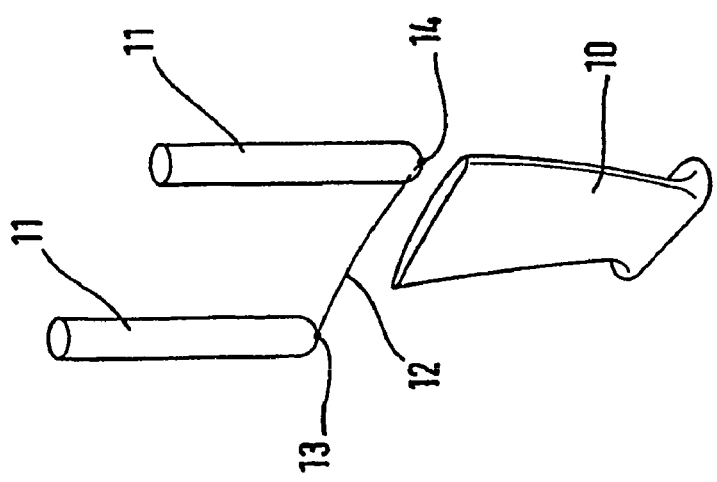
Figure 4:
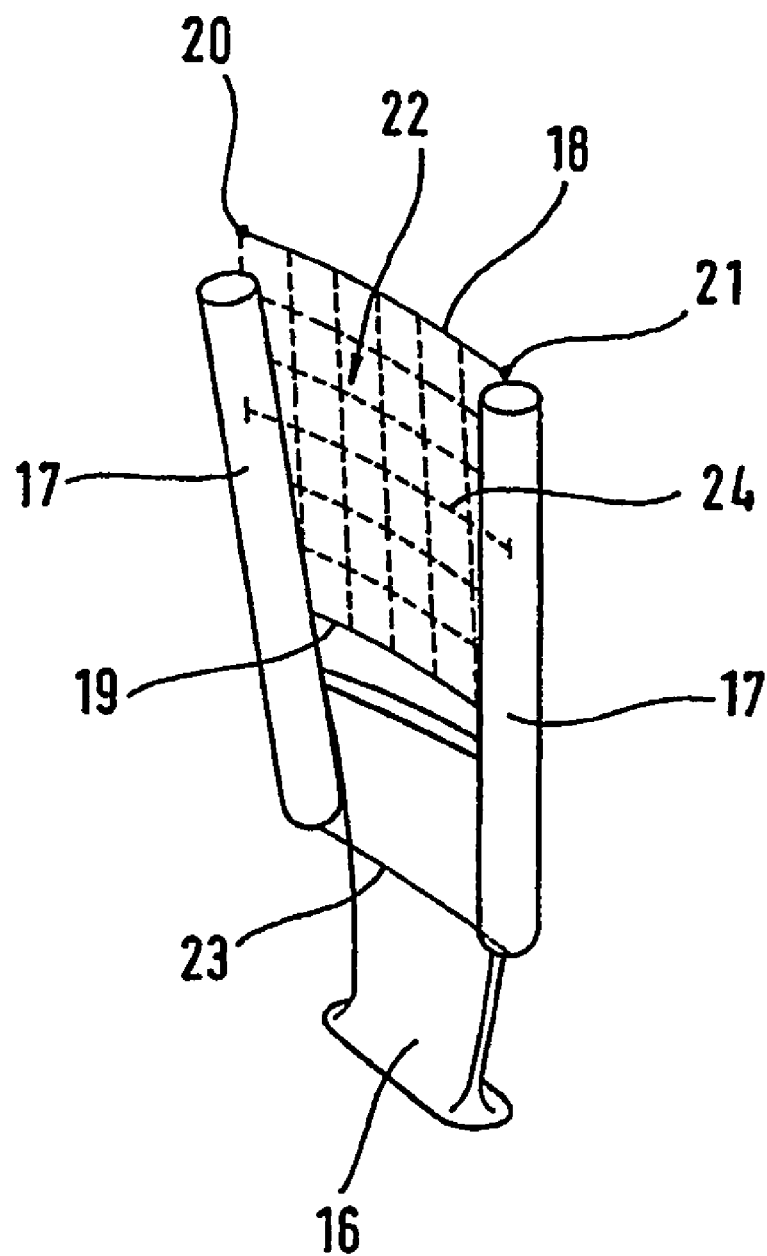
Figure 5:
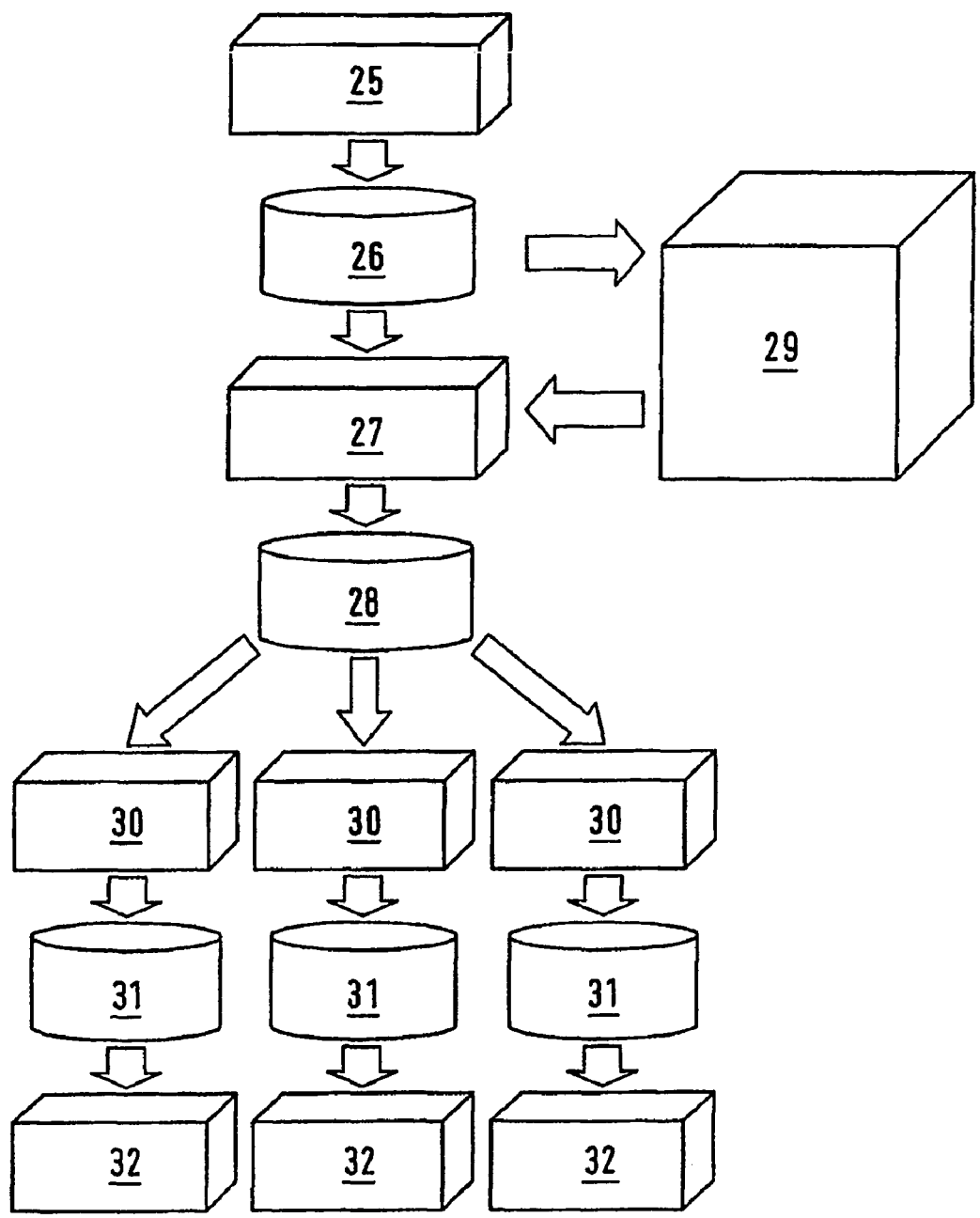

Exemplary embodiments of the present invention are explained in detail in light of the drawing, without being limited to it. The figures in the drawing show:

FIG. 1: a workpiece to be cut, shown for the purpose of illustrating a first specific embodiment of the method according to the present invention;

FIG. 2: the workpiece of FIG. 1, shown in order to further illustrate the first specific embodiment of the method according to present invention;

FIG. 3: the workpiece of FIGS. 1 and 2, shown in order to further illustrate the first specific embodiment of the method according to present invention;

FIG. 4: a workpiece to be cut, shown for the purpose of illustrating a second specific embodiment of the method according to the present invention; and FIG. 5: a highly schematic block diagram of a device of the present invention for cutting freeform surfaces.

In the following, the present invention will be described in greater detail with reference to the figures. However, before presenting the details of the method of the present invention and the device of the present invention, a few concepts, to which reference will be made later, shall be defined below.

When cutting a workpiece to be machined, a desired three-dimensional geometry is to be produced on the surface of the workpiece. This desired three-dimensional geometry on the surface of the workpiece is also called a freeform surface.

The cutting of the workpiece to be machined is accomplished with the aid of a tool, a so-called cutter. For the purpose of machining the workpiece, the tool or cutter is moved relative to the workpiece. The motion of the tool or cutter relative to the workpiece is described by so-called tool coordinates, the tool coordinates defining the position of a tool tip or a tool reference point. The movement of the tool tip or the tool reference point during the cutting of the workpiece is called the tool path or cutting path. Starting from the tool tip or the tool reference point, a vector extends along a tool axis or tool shaft of the tool or cutter. This vector, which starts out from the tool tip and travels along the tool axis in the direction of the tool shaft, is referred to as the tool vector.

The cutting of a workpiece for producing a defined three-dimensional freeform surface is accomplished with the aid of so-called five-axis cutting. In five-axis cutting, the tool may be moved along five axes relative to the workpiece to be machined. Three axes are used for the linear movement of the tool relative to the workpiece, which means that every point in space may be reached. In addition to this linear movement along the so-called linear axes, the tool may also be moved about a swivel axis and a tilt axis for undercutting. Rotational movements of the cutting tool are possible along the swivel axis and the tilt axis. This makes it possible to access all points in space without collision. The swivel axis as well as the tilt axis are also frequently referred to in general as rotary axes.

A method for cutting freeform surfaces on a workpiece is provided in accordance with the present invention, a tool or a cutter being moved along at least one defined tool path or cutting path relative to the workpiece, in order to carry out the cutting of the workpiece. In addition to the, or each tool path, at least one guide curve is defined for a tool vector of the tool. During the cutting, the tool vector is oriented as a function of the, or each guide curve.

A first exemplary embodiment of the method according to the present invention is described in detail below, with reference to FIGS. 1 through 3. FIGS. 1 through 3 show a workpiece 10 to be machined, which, in the exemplary embodiment shown, takes the form of a rotor blade of a gas turbine or blisk. With the aid of a tool 11, i.e. a cutter in the exemplary embodiment shown, workpiece 10 should be machined to produce the desired freeform surface on a surface of workpiece 10. FIGS. 1 through 3 each show tool 11 in two different positions relative to workpiece 10.

The exemplary embodiment of FIGS. 1 through 3 relates to a specific embodiment of the method according to the present invention, where a single guide curve is defined. Cutting with the aid of a single guide curve is then advantageous, when the workpiece to be machined or its surface to be machined does not have any sharp curvature at right angles to the cutting direction and the position of workpiece 11 or the cutter with respect to workpiece 10 can be roughly the same for all of the cutting.

To define guide curve 12 for the tool vector of tool 11, the procedure is as shown in FIG. 1. In this case, tool 11 or the cutter is moved along a curve parallel to the surface of the workpiece, the tool tip of tool 11 being moved on this curve from a starting point 13 to an end point 14. The path traced by the tool tip between starting point 13 and end point 14 defines guide curve 12 for the tool vector of tool 11. All movements of tool 11, which are programmed between this starting point 13 and end point 14, are interpreted as guide curve 12. The sense of direction of guide curve 12 corresponds to the sense of direction of the later cutting of workpiece 10. In this connection, it is important that the tool tip of tool 11 is moved for defining the guide curve in such a manner, that the prevention of a collision with workpiece 10 or an adjacent workpiece is ensured. Accordingly, workpiece 10 may be machined along guide curve 12 in a collision-free manner.

Guide curve 12 defined in accordance with FIG. 1 may be activated or deactivated. Therefore, it is within the spirit of the present invention that the actual cutting of workpiece 10 may be carried out, on one hand, using guide curve 12, as well as without taking guide curve 12 into consideration. When guide curve 12 is activated, the cutting of workpiece 10 is carried out as a function of guide curve 12. However, when guide curve 12 is deactivated, it is ignored during the cutting of the workpiece. FIG. 2 shows the cutting of workpiece 10 while guide curve 12 is deactivated, whereas FIG. 3 shows the cutting of workpiece 10 while guide curve 12 is activated.

As previously mentioned, FIG. 2 shows the cutting of workpiece 10 while guide curve 12 is deactivated. In this case, the path of travel of tool 11 and the orientation of the tool vector of tool 11 are determined solely on the basis of the defined tool paths or cutting paths, without taking guide curve 12 into consideration.

However, when guide curve 12 is activated, it is within the spirit of the present invention to orient the tool vector of the tool in such a manner, that the tool vector travels through guide path 12, starting out from the tool tip that is moved along the tool path. This can be gathered from FIG. 3. At the beginning of a tool path 15 or cutting path, the tool vector travels, in the case of an activated guide curve 12, through starting point 13 and to the end of tool path 15, through end point 14 of guide curve 12. Between starting point 13 and end point 14, the intersection of the tool vector and guide curve 12 is interpolated as a function of a path ratio. This path ratio is the ratio of the distance traveled by tool 11 on its current tool path 15, to the total distance along the current tool path.

FIG. 4 illustrates a second exemplary embodiment of the present invention. FIG. 4 again shows a workpiece 16, which shall be machined with the aid of a tool 17, namely a cutter. FIG. 4 again shows tool 17 in two different positions relative to workpiece 16.

In addition to the, or each tool path, the exemplary embodiment of FIG. 4 provides for two guide curves to be defined for the tool vector of tool 17, namely a first, upper guide curve 18 and a second, lower guide curve 19. The exemplary embodiment having two guide curves is particularly suitable, when the surface to be machined of workpiece 10 to be machined has a sharp curvature at right angles to the cutting direction and the orientation of the tool vector must change more sharply from the first to the last tool path or cutter path.

To define the two guide curves 18, 19, the procedure is analogous to the exemplary embodiment of FIGS. 1 through 3. To define first guide curve 18, the tool tip of tool 17 is moved from a starting point 20 to an end point 21 of first guide curve 18. To define second guide curve 19, the tool tip of tool 11 is moved in an analogous manner from a starting point of the same to an end point of the same. Based on the representation in FIG. 4, both the starting point and the end point of second guide curve 19 are not shown, because they are each covered by tool 17. The direction of the two guide curves 18, 19 corresponds, in turn, to the direction of the actual cutting of workpiece 16.

In this connection, it is important that first, upper guide curve 18 is defined in such a manner, that along first guide curve 18, workpiece 16 may be machined in the upper region in a collision-free manner. Second, lower guide curve 19 is selected so that workpiece 16 to be machined may be machined in a lower region in a collision-free manner.

As can be gathered from FIG. 4, first, upper guide curve 18 and second, lower guide curve 19 define a guide surface 22. When guide curves 18, 19 are activated, the tool vector of tool 17 is oriented in such a manner, that a guide curve 24 is ascertained by interpolation as a function of a ratio of a current cutting path or tool path 23, to the total number of cutting paths or tool paths; the tool vector of tool 17 being forced by this interpolated guide curve 24. This means that the tool vector is then guided by interpolated guide curve 24, starting out from the tool tip that moves on the current cutting path or tool path.

In detail, the procedure is such that the tool vectors are oriented to intersect the guide surface 22 defined by the two guide curves 18, 19, as follows. Perpendicular to the cutting direction, the tool vector of tool 17 intersects guide surface 22 at the first tool path or cutting path in first, upper guide curve 18, and at the last cutting path or tool path in second, lower guide curve 19. Interpolated guide curve 24 is interpolated between them as a function of the ratio of the total number of tool paths to current tool path 23.

In the direction of the cutting, the intersection of the tool vector and the first, second, or interpolated guide curve 18, 19, or 24 is determined in a manner analogous to the exemplary embodiment of FIGS. 1 through 3. This means that the tool vector travels through a starting point of specific guide curve 18, 19, or 24 at the beginning of current tool path 23 or cutting path, and through an end point of the specific guide curve at the end of the current tool path or cutter path. The intersection of the tool vector and specific guide curve 18, 19, or 24 is interpolated between them as a function of a path ratio.

At this point, it is noted that in both the exemplary embodiment according to FIGS. 1 through 3 and the exemplary embodiment according to FIG. 4, the tool does not have to be moved as described above to define the, or each guide curve. Rather, the, or each guide curve may also be defined by directly programming a curve in a CAD/CAM system.

In addition to the, or each tool path, and in addition to the, or each guide curve 12 or 18, 19, an advantageous further refinement of the method according to the present invention allows synchronization points to be defined in both the first exemplary embodiment and the second exemplary embodiment of the present invention. The orientation of the tool vector between the tool path and the guide path is synchronized with the aid of synchronization points. In this context, it is ensured that at each synchronization point of the tool path or cutting path, the tool vector travels through the corresponding synchronization point of the corresponding guide curve. This is always advantageous when the tool path has a shape or relative size that deviates from the guide curve.

The synchronization points are defined when the corresponding guide curve is defined and the tool paths are defined.

This ensures that there is a guide-curve synchronization point corresponding to each synchronization point of the tool path, if the number of synchronization points of the, or each tool path is equal to the number of synchronization points of the, or each guide curve.

FIG. 5 shows a highly schematic block diagram of a device of the present invention for cutting freeform surfaces. In the exemplary embodiment shown, the device of the present invention includes a first programming device 25 for programming at least one tool path or cutting path of a cutting tool. The tool or the cutter is movable relative to the workpiece, along these tool paths defined in first programming device 25. First programming device 25 is a CAD/CAM system. In this CAD/CAM system, the tool paths or cutting paths of the tool are programmable in a conventional manner. The CAD/CAM system generates a so-called APT (automatic programming tool) file 26, an APT processor 27 generating a machine-independent control file 28 for the cutting of the workpiece from APT file 26.

In addition to first programming device 25, the device of the present invention includes means for programming the, or each guide curve for a tool vector of the tool; in the exemplary embodiment shown, these means taking the form of a second programming device 29. In second programming device 29, additional functions based on the programming language APT are provided, which are used for defining at least one guide curve for a tool vector of the tool, the tool vector being controllable as a function of the, or each guide curve during the cutting.

In the case of an activated guide curve or activated guide curves, the guide curves are linked in the APT computing operation of FIG. 5 in such a manner, that tool vectors generated by the CAD/CAM system are replaced by tool vectors generated by second programming device 29. With the aid of so-called postprocessors 30, so-called NC data 31 are generated from control file 28, which are machine-dependent and are used for controlling the individual motion axes of NC machine 32, i.e. the cutting machine.

At this juncture, it should be pointed out that means for programming the, or each guide curve 12 or 18, 19 may also be integrated into programming device 25 for programming the, or each tool path or cutter path. In this case, a single programming device is present and the tool vectors are directly controlled in the CAD/CAM system.

The cutting of freeform surfaces may be considerably improved with the aid of the method according to the present invention and the device according to the present invention. With the aid of the present invention, good cutting results may even be obtained when there are discontinuities in the CAD model. Since no more support vectors must be generated for the cutting, the machining time is further reduced. It is no longer necessary to correct the CAD model with respect to discontinuities. The number of iteration steps in the programming and testing of the cutting may be reduced, since the, or each guide curve allows a collision with the machined workpiece or an adjacent workpiece to be reliably prevented. The result of the cut surface also improves. Subsequent machining steps for improving the surface may be avoided. Since vibrations of the cutting machine may be prevented with the aid of the present invention, on one hand, the wear on the cutting machine decreases and, on the other hand, the production of waste is markedly reduced.

The device of the present invention and the method of the present invention are particularly suited for the cutting of compressor or turbine blades on so-called blisks. With the aid of the present invention, it is possible, for the first time, to economically mass-produce blisks on cutting machines.

What is claimed is:

1. A method, comprising:
   cutting freeform surfaces on a workpiece a tool to produce a desired freeform surface, including:
   moving the tool cutter along at least one of (a) at least one defined tool path and (b) at least one defined cutting path relative to the workpiece;
   defining a first guide curve for a tool vector of the tool, the tool vector oriented as a function of each guide curve during cutting;
   defining a second guide curve for the tool vector of the tool, the first guide curve and the second guide curve defined such that the workpiece is machinable in a collision-free manner;
   determining a guide surface in accordance with the first guide curve and the second guide curve;
   ascertaining a third guide curve arranged on the guide surface as a function of a ratio of a current cutting path to a total number of cutting paths; and
   guiding the tool vector by the guide curve.

2. The method according to claim 1, wherein the cutting includes five-axis cutting.

3. The method according to claim 1, wherein the tool includes a cutter.

4. The method according to claim 1, wherein the cutting includes selectively activating and deactivating the first guide curve and the second guide curve, the tool vector oriented as a function of each activated guide curve.

5. The method according to claim 1, wherein the cutting includes:
   defining synchronization points; and
   synchronizing the orientation of the tool vector between the tool path and each guide curve in accordance with the synchronization points.

6. The method according to claim 1, wherein a direction of the first guide curve and the second guide curve corresponds to a direction of the cutting of the workpiece.

7. The method according to claim 1, wherein at right angles to a cutting direction, the tool vector intersects the guide surface at a first cutting path in the first guide curve, the tool vector intersects the guide surface at a last cutting path in the second guide curve, and an interpolated guide curve arranged in the guide surface between the first guide curve and the second guide curve is ascertained by interpolation as a function of the ratio of the current cutting path to the total number of cutting paths; and
   wherein in the cutting direction, an intersection of the tool vector and one of (a) the first guide curve, (b) the second guide curve and (c) the interpolated guide curve is ascertained such that the tool vector passes through a starting point of the one of (a) the first guide curve, (b) the second guide curve and (c) the interpolated guide curve at the beginning of the cutting path and passes through an end point of the one of (a) the first guide curve, (b) the second guide curve and (c) the interpolated guide curve at the end of the cutting path, the intersection of the tool vector and the one of (a) the first guide curve, (b) the second guide curve and (c) the interpolated guide curve interpolated as a function of a path ratio between the starting point and the end point.

8. A device for cutting freeform surfaces on a workpiece, comprising:
   a tool adapted to cut the workpiece to produce a desired freeform surface;
   a first programming device adapted to program at least one tool path, the tool movable along the tool path relative to the workpiece, the first programming device includes a device adapted to program a first guide curve for a tool vector of the tool, the tool vector controllable as a function of the first guide curve during cutting; and
   a second programming device adapted to program a second guide curve for the tool vector of the tool, the tool adapted to machine the workpiece on the guide curves in a collision-free manner, the first guide curve and the second guide curve defining a guide surface, the tool movable on a third guide curve arranged on the guide surface, the tool guided as a function of a ratio of a current cutting path to a total number of cutting paths.

9. The device according to claim 8, wherein the device is arranged as a five-axis cutting device.

10. The device according to claim 8, wherein the tool includes a cutter.

11. The device according to claim 8, wherein the first programming device includes a CAD/CAM system adapted to program the tool path, the CAD/CAM system adapted to generate at least one APT file that is convertible by at least one downstream processor into at least one executable NC file.

12. The device according to claim 11, wherein the second programming device is adapted to generate ATP data that is integratable into the APT file such that, for an activated guide curve, tool vectors generated by the first programming device are replaced by tool vectors that are a function of each guide curve.

13. The device according to claim 8, wherein the device adapted to program the first guide curve and the second programming device are integrated into the first programming device.

* * * * *